United States Patent
Celikyilmaz et al.

(10) Patent No.: US 11,715,000 B2
(45) Date of Patent: Aug. 1, 2023

(54) INQUIRY-BASED DEEP LEARNING

(71) Applicant: Microsoft Technology Licensing, LLC, Redmond, WA (US)

(72) Inventors: Fethiye Asli Celikyilmaz, Kirkland, WA (US); Li Deng, Redmond, WA (US); Lihong Li, Redmond, WA (US); Chong Wang, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1673 days.

(21) Appl. No.: 15/639,304

(22) Filed: Jun. 30, 2017

(65) Prior Publication Data

US 2019/0005385 A1    Jan. 3, 2019

(51) Int. Cl.
  *G06N 3/08*     (2023.01)
  *G06F 16/332*   (2019.01)
  *G06N 3/006*    (2023.01)

(52) U.S. Cl.
  CPC ........... *G06N 3/08* (2013.01); *G06F 16/3329* (2019.01); *G06N 3/006* (2013.01)

(58) Field of Classification Search
  CPC ............ G06N 3/08; G06N 3/04; G06N 3/063; G06N 3/082; G06N 20/00
  USPC ......................................................... 706/25
  See application file for complete search history.

(56) References Cited

U.S. PATENT DOCUMENTS

2017/0024645 A1 * 1/2017 Socher ................ G06F 16/3329

OTHER PUBLICATIONS

Henaff et al.—"Tracking the World State With Recurrent Entity Networks"—May 10, 2017—https://arxiv.org/abs/1612.03969 (Year: 2017).*
Zubek et al.—"Pruning Improves Heuristic Search for Cost-Sensitive Learning"—2002—https://www.semanticscholar.org/paper/Pruning-Improves-Heuristic-Search-for-Learning-Zubek-Dietterich/5a60244957e52bdbf1627fd9d70b11044c8a2c0c (Year: 2002).*
Jason Weston—"Dialog-based Language Learning"—2016—https://arxiv.org/pdf/1604.06045.pdf (Year: 2016).*

(Continued)

*Primary Examiner* — Viker A Lamardo
(74) *Attorney, Agent, or Firm* — Schwegman Lundberg & Woessner, P.A.

(57) ABSTRACT

Systems and methods are disclosed for inquiry-based deep learning. In one implementation, a first content segment is selected from a body of content. The content segment includes a first content element. The first content segment is compared to a second content segment to identify a content element present in the first content segment that is not present in the second content segment. Based on an identification of the content element present in the first content segment that is not present in the second content segment, the content element is stored in a session memory. A first question is generated based on the first content segment. The session memory is processed to compute an answer to the first question. An action is initiated based on the answer. Using deep learning, content segments can be encoded into memory. Incremental questioning can serve to focus various deep learning operations on certain content segments.

18 Claims, 7 Drawing Sheets

(56) References Cited

OTHER PUBLICATIONS

Narasimhan et al.—"Language Understanding for Text-based Games using Deep Reinforcement Learning"—2015—https://arxiv.org/pdf/1506.08941.pdf (Year: 2015).*

Mnih et al.—"Asynchronous Methods for Deep Reinforcement Learning"—2016—https://arxiv.org/pdf/1602.01783.pdf (Year: 2016).*

Klein et al.—"Fast Exact Inference with a Factored Model for Natural Language Parsing"—2002—https://dl.acm.org/doi/10.5555/2968618.2968619 (Year: 2002).*

Heilman et al.—"Good Question! Statistical Ranking for Question Generation"—2010—https://dl.acm.org/doi/10.5555/1857999.1858085 (Year: 2010).*

Levy et al.—"Tregex and Tsurgeon: tools for querying and manipulating tree data structures"—2006—http://citeseerx.ist.psu.edu/viewdoc/summary?doi=10.1.1.380.3530 (Year: 2006).*

Andreas, et al., "Learning to Compose Neural Networks for Question Answering", In Proceedings of the Conference of the North American Chapter of the Association for Computational Linguistics: Human Language Technologies, Jun. 12, 2016, pp. 1545-1554.

Suay, et al., "Effect of Human Guidance and State Space Size on Interactive Reinforcement Learning", In 20th IEEE International Symposium on Robot and Human Interactive Communication (Ro-Man), Jul. 31, 2011, 6 Pages.

Celikyilmaz, et al., "Scaffolding Networks: Incremental Learning and Teaching Through Questioning", Retrieved From «https://arxiv.org/pdf/1702.08653v2.pdf», May 19, 2017, 12 Pages.

Chen, et al., "A Thorough Examination of the CNN/Daily Mail Reading Comprehension Task", In Proceedings of the 54th Annual Meeting of the Association for Computational Linguistics, Aug. 7, 2016, pp. 2358-2367.

Cui, et al., "Attention-over-Attention Neural Networks for Reading Comprehension", Retrieved From: «https://arxiv.org/pdf/1607.04423.pdf», Jun. 6, 2017, 10 Pages.

Dhingra, et al., "Gated-Attention Readers for Text Comprehension", Retrieved From: «https://arxiv.org/pdf/1606.01549.pdf», Apr. 21, 2017, 15 Pages.

Guo, et al., "Learning to Query, Reason and Answer Question On Ambiguous Texts", In 5th International Conference on Learning Representations, Apr. 24, 2017, 12 Pages.

Henaff, et al., "Tracking the World State With Recurrent Entity Networks", In 5th International Conference on Learning Representations, Apr. 24, 2017, 14 Pages.

Hermann, et al., "Teaching Machines to Read and Comprehend", In Proceedings of the 28th International Conference on Neural Information Processing Systems—vol. 1, Dec. 7, 2015, 9 Pages.

Hill, et al., "The Goldilocks Principle: Reading Children's Books with Explicit Memory Represenations", Retrieved From «https://arxiv.org/pdf/1511.02301v4.pdf», Apr. 1, 2016, 13 Pages.

Hochreiter, et al., "Long Short-Term Memory", In Neural Computation Journal, vol. 9, Issue 8, Nov. 15, 1997, 32 Pages.

Yu, et al., "End-to-End Answer Chunk Extraction and Ranking for Reading Comprehension", In 5th International Conference on Learning Representations, Apr. 24, 2017, 12 Pages.

Kim, Youb, "Scaffolding through Questions in Upper Elementary ELL Learning", In Literacy Teaching and Learning International Journal, vol. 15, Issue 1-2, 2010, pp. 109-136.

Kumar, et al., "Ask me Anything: Dynamic Memory Networks for Natural Language", In Proceedings of the 33rd International Conference on Machine Learning, vol. 48, Jun. 19, 2016, 10 Pages.

Mnih, et al., "Human-Level Control Through Deep Reinforcement Learning", In Journal—Nature, vol. 518, Feb. 26, 2015, 13 Pages.

Rocktaschel, et al., "Reasoning About Entailment With Neural Attention", Retrieved From «https://arxiv.org/pdf/1509.06664.pdf», Mar. 1, 2016, 9 Pages.

Sordoni, et al., "Iterative Alternating Neural Attention for Machine Reading", Retrieved From «https://arxiv.org/pdf/1606.02245.pdf», Nov. 9, 2016, 9 Pages.

Zimmer, et al., "Teacher-Student Framework: A Reinforcement Learning Approach", In Proceedings of the AAMAS Workshop Autonomous Robots and Multirobot Systems, May 5, 2014, 17 Pages.

Weissenborn, Dirk, "Separating Answers from Queries for Neural Reading Comprehension", Retrieved From «https://arxiv.org/pdf/1607.03316.pdf», Sep. 27, 2016, 10 Pages.

Weston, Jason, "Dialog Based Language Learning", Retrieved From: «https://arxiv.org/pdf/1604.06045.pdf», Oct. 24, 2016, 10 Pages.

Weston, et al., "Towards AI-Complete Question Answering: A Set of Prerequisite Toy Tasks", Retrieved From «https://arxiv.org/pdf/1502.05698.pdf», Dec. 31, 2015, 14 Pages.

Xiong, et al., "Dynamic Memory Networks for Visual and Textual Question Answering", In n Proceedings of the 33rd International Conference on Machine Learning, vol. 48, Jun. 19, 2016, 10 Pages.

Yu, et al., "A deep Compositional Framework for Human-Like Language Acquisition in Virtual Environment", Retrieved From: «https://arxiv.org/pdf/1703.09831.pdf», May 19, 2017, 16 Pages.

Hogan, et al., "Scaffolding Student Learning: Instructional Approaches and Issues", In Advances in Learning & Teaching series, Brookline Books, Jan. 1997, pp. 1-198.

* cited by examiner

INQUIRY-BASED DEEP LEARNING

TECHNICAL FIELD

Aspects and implementations of the present disclosure relate to data processing and, more specifically, but without limitation, to inquiry-based deep learning.

BACKGROUND

Personal digital assistants are applications or services that retrieve information or execute tasks on behalf of a user. Users can communicate with such personal digital assistants using conversational interfaces such as messaging or chat interfaces.

SUMMARY

The following presents a shortened summary of various aspects of this disclosure in order to provide a basic understanding of such aspects. This summary is not an extensive overview of all contemplated aspects, and is intended to neither identify key or critical elements nor delineate the scope of such aspects. Its purpose is to present some concepts of this disclosure in a compact form as a prelude to the more detailed description that is presented later.

In one aspect of the present disclosure, Systems and methods are disclosed for inquiry-based machine learning. In one implementation, a first content segment is selected from a body of content. The content segment includes a first content element. The first content segment is compared to a second content segment to identify a content element present in the first content segment that is not present in the second content segment. Based on an identification of the content element present in the first content segment that is not present in the second content segment, the content element is stored in a session memory. A first question is generated based on the first content segment. The session memory is processed to compute an answer to the first question. An action is initiated based on the answer.

BRIEF DESCRIPTION OF THE DRAWINGS

Aspects and implementations of the present disclosure will be understood more fully from the detailed description given below and from the accompanying drawings of various aspects and implementations of the disclosure, which, however, should not be taken to limit the disclosure to the specific aspects or implementations, but are for explanation and understanding only.

DETAILED DESCRIPTION

Aspects and implementations of the present disclosure are directed to inquiry-based machine learning.

Various existing technologies attempt to comprehend human language using fixed training texts of supervised data. While such approaches can identify certain explicit relationships/associations within a text, these technologies do not effectively identify more complex/deeper relationships.

Accordingly, described herein in various implementations, are technologies, including methods, machine readable mediums, and systems, that enable inquiry-based machine learning. For example, the described technologies can use an automated question and answer framework to extract information from a body of content (e.g., a document, webpage, etc.), identify relationships among concepts, etc. In certain implementations, the described technologies can process content (e.g., a document) or a portion/segment thereof (one line, sentence, etc., at a time). Question(s) are generated with respect to such content segment(s) and answers are attempted (based on previously processed content). Feedback received (reflecting whether such answers are correct or incorrect) reinforces various associations/relationships between words, concepts, etc. Over time, questions can be generated to direct the described technologies towards identifying increasingly complex relationships.

Moreover, in certain implementations various techniques pertaining to scaffolding networks are implemented e.g., to train a machine or system to perform various reasoning operations. For example, a teaching algorithm can be implemented to iteratively learn to map facts/content within sentences (such as 'hidden' facts which may not be explicit) into state representation. In certain implementations, such content can be mapped using an attention network. Additionally, the representation of the previous sentences of the text can be maintained in memory over the course of the referenced operations. In doing so, interactive learning approaches are applied to machine comprehension, enabling the machine to learn to generate questions using question simulator/generator. The network further learns to ask questions as well as encode the text at the same time. The question generator acts as an implicit 'teacher' to guide the learning through a body of content/text.

The described technologies can further provide a modular interactive neural network model that introduces teacher-student framework to incrementally learn the state of various bodies of content (and beyond) by extracting the facts, entities, etc., from such content and registering their relations (e.g., into a session memory). Additionally, using various scaffolding questions from the 'teacher,' (which can be an artificial agent) the 'student' learner attempts to determine/predict the correct answers to questions about entities, facts, etc. observed within the content so far, yielding a robust learner.

As described herein, in certain implementations the described technologies can include a question generation engine (which can operate as a 'teacher' with respect to the referenced scaffolding network) and a content analysis engine (which can operate as a 'student'). During training, question generation engine (the 'teacher') can ask content analysis engine (the 'student') questions about a body of content (e.g., text). The 'student' can then be 'rewarded' by correctly answering the questions while learning to extract information about new concepts from the text and their relations (as described herein). In certain implementations, the referenced 'student' can be implemented as an attention-based neural network that may starts with an empty memory and learns to register the key information in the text by incrementally encoding a new sentence at a time.

By way of illustration, the referenced scaffolding network (as described herein) can include and combine elements corresponding to both the referenced 'teacher' and 'student' (e.g., within a single environment/network). The student (e.g., 'content analysis engine,' as described herein) can observe/process content/text one sentence/segment at a time. Such an approach provides the engine with limited (partial) information about the state of the world (without having prior information regarding entities, slots or relations between them). Content analysis engine can be configured to perform sentence-level interpretation, using recurrent memory structure and an attention mechanism to track the changes of facts/elements (e.g., over the course of story or dialog) and to identify new elements, etc. that have not been previously observed.

Additionally, question generation engine (the 'teacher') can generate question-answer pairs related to the content/text observed/processed so far. These question(s) can be presented to content analysis engine (the 'student'). By observing/analyzing a sentence and a question, the 'student' consequently learns to encode and answer the question (e.g., based on the reward feedback/signal it receives).

In certain implementations, a reinforcement learning (RL) framework can be employed, e.g., to provide a setting for step by step teaching of semantic understanding. The content analysis engine (the 'student') can be configured to maximize its rewards that it obtains upon answering generated questions. Additionally, question generation engine (the 'teacher'), observing the errors that the 'student' makes, can guide or direct the 'student' to focus different parts of the text. For example, the teacher can generate and provide to the student scaffolding questions about the observed information (e.g., in order to improve comprehension by the student).

In doing so, content analysis engine (the 'student') can learn to parse and reason, e.g., over the 'hidden' information it observes from the environment, learning to answer questions posed by the 'teacher.' Content analysis engine (the 'student') can be configured to attempt to maximize the sum of the rewards it receives, e.g., until the end of the content/document is reached by correctly answering as many questions as possible. In certain implementations, the student can start at an initial state (with nothing in memory) and can learn to parse the sentences/segments into information, e.g., by encoding the sentences together with questions (e.g., through trial and error using an RL algorithm).

Depending on the student's answer, the described technologies can proceed to the next sentence in the text (e.g., if the answer is correct) or stay on the same sentence until the student learns to answer one question correctly (or a defined number of attempts are exhausted), with the teacher generating new questions each time.

It can therefore be appreciated that the described technologies are directed to and address specific technical challenges and longstanding deficiencies in multiple technical areas, including but not limited to content analysis, semantic relationships, and machine learning. As described in detail herein, the disclosed technologies provide specific, technical solutions to the referenced technical challenges and unmet needs in the referenced technical fields and provide numerous advantages and improvements upon conventional approaches. Additionally, in various implementations one or more of the hardware elements, components, etc., referenced herein operate to enable, improve, and/or enhance the described technologies, such as in a manner described herein.

Figure 1:
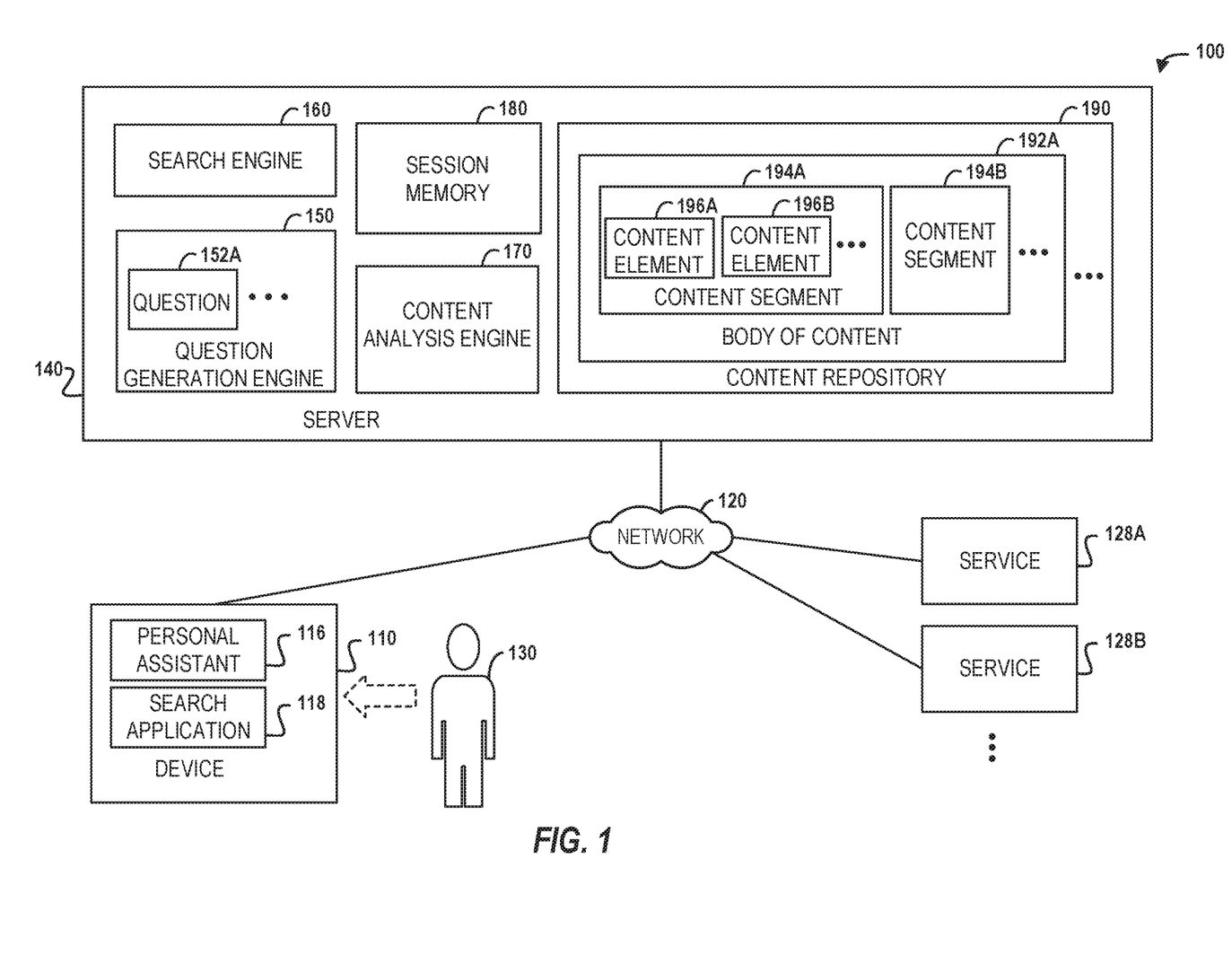
FIG. 1 illustrates an example system, in accordance with an example embodiment.

FIG. 1 illustrates an example system 100, in accordance with some implementations. As shown, the system 100 includes device 110 which can be a laptop computer, a desktop computer, a terminal, a mobile phone, a tablet computer, a smart watch, a wearable device, a personal digital assistant (PDA), a digital music player, a server, and the like. User 130 can be a human user who interacts with device 110. For example, user 130 can provide various inputs (e.g., via an input device/interface such as a keyboard, mouse, touchscreen, etc.) to device 110. Device 110 can also display, project, and/or otherwise provide content to user 130 (e.g., via output components such as a screen, speaker, etc.).

As shown in FIG. 1, device 110 can include personal assistant 116 and search application 118. Personal assistant 116 can be an application or module that configures/enables the device to interact with, provide content to, and/or otherwise perform operations on behalf of user 130. For example, personal assistant 116 can receive communications and/or request(s) from user 130 and present/provide responses to such request(s) (e.g., within a conversational or 'chat' interface). In certain implementations, personal assistant 116 can also identify content that can be relevant to user 130 (e.g., based on a location of the user or other such context) and present such content to the user. Personal assistant 116 can also enable user 130 to initiate and/or configure other application(s). For example, user 130 can provide a command/communication to personal assistant 116 (e.g., 'play jazz music'). In response to such command, personal assistant 116 can initiate an application (e.g., a media player application) that fulfills the request provided by the user. Personal assistant can also initiate and/or perform various other operations, such as are described herein.

Search application 118 can be an application or module that configures/enables the device to search for and/or retrieve information, e.g., in response to a request or query from user 130. For example, upon receiving a query from user 130, search application can search through local content stored on device 110 to retrieve information related to the search query. In certain implementations, search application can communicate with search engine 160 executing on server 140. In doing so, content from various remote sources can be search and retrieved.

It should be noted that while various components (e.g., personal assistant 116) are depicted and/or described as operating on a device 110, this is only for the sake of clarity. However, in other implementations the referenced components can also be implemented on other devices/machines. For example, in lieu of executing locally at device 110, aspects of personal assistant 116 can be implemented remotely (e.g., on a server device or within a cloud service or framework). By way of illustration, personal assistant 116 can operate in conjunction with a personal assistant engine executing on a remote device (e.g., server 140, as described below). In doing so, personal assistant 116 can, for example, request or receive information, communications, etc., from such a personal assistant engine, thereby enhancing the functionality of personal assistant 116.

Figure 5:
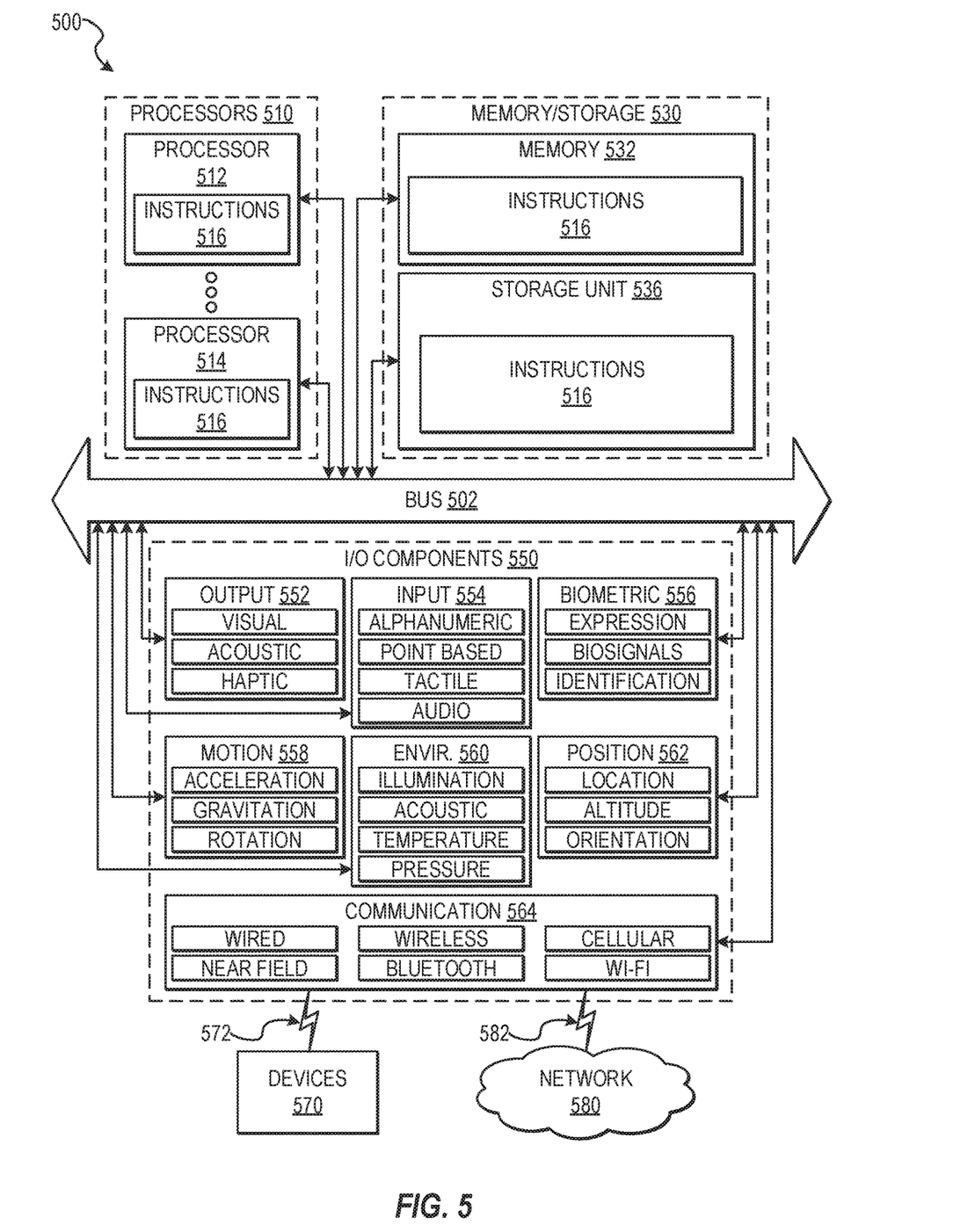
FIG. 5 is a block diagram illustrating components of a machine able to read instructions from a machine-readable medium and perform any of the methodologies discussed herein, according to an example embodiment.

The application(s) referenced above/herein (e.g., personal assistant 116) can be stored in memory of device 110 (e.g. memory 530 as depicted in FIG. 5 and described below). One or more processor(s) of device 110 (e.g., processors 510 as depicted in FIG. 5) can execute such application(s). In doing so, device 110 can be configured to perform various operations, present content to user 130, etc. Other examples of such applications include but are not limited to: social media/messaging applications, mobile 'apps,' etc.

As also shown in FIG. 1, device 110 can connect to and/or otherwise communicate with server 140 via network 120. Network 120 can include one or more networks such as the Internet, a wide area network (WAN), a local area network (LAN), a virtual private network (VPN), an intranet, and the like.

Server 140 can be, for example, a server computer, computing device, storage service (e.g., a 'cloud' service), etc., and can include question generation engine 150, search engine 160, content analysis engine 170, session memory 180, and content repository 190.

Content analysis engine 170 (also referred to herein as a 'student') can be an application or module that configures/enables server 140 to perform various operations such as are described herein. For example, content analysis engine 170 to process content within content repository 190 and store such processed content within session memory 180, as described herein.

Content repository 190 can be a storage resource such as an object-oriented database, a relational database, etc. In certain implementations, content repository 190 can store various bodies of content such as body of content 192A. Body of content 192A can be, for example, a document, webpage, or any other such file that contains information. In certain implementations, body of content 192A can include various content segments, such as content segment 194A and 194B. Such content segments can be, for example, units of content such as lines or sentences in a document. Such content segments can further include various content elements, such as content element 196A and content element 196B. Such content elements can be, for example, words, clauses, etc., that make up a content segment (e.g., a sentence).

As described herein, content analysis engine 170 can process or analyze body of content 192A, e.g., with respect to the various content segment(s) and content element(s) contained therein. For example, content analysis engine 170 can identify or parse the various content elements contained within a content segment, and store such content elements within session memory 180. In certain implementations, such content elements can be stored within session memory in a manner that reflects various associations/relationships between the various content elements.

Additionally, in certain implementations content analysis engine 170 can encode the referenced content element(s) and/or content segment(s) in various ways. For example, content analysis engine 170 can encode a content segment into a representation such as a multidimensional vector representation. The vector representations of respective content segment(s) can reflect, for example, similarities, differences, relationships, associations, etc., between the various content segments.

Session memory 180 can be a memory device, component, or element, such as those described herein. In certain implementations, session memory can include a multidimensional vector space within which the referenced vector representation(s) (corresponding to respective content segment(s)) are stored. In certain implementations, such vector representations (or 'vectors') are stored within the vector space (e.g., as a series of real numbers) such that vectors sharing various content segment(s) (and/or other characteristics) are positioned relatively closer together within the vector space.

Question generation engine 150 can be an application or module that configures/enables server 140 to perform various operations such as are described herein. For example, question generation engine 150 can generation various questions (e.g., question 152A) that are utilized/accounted for by content analysis engine 170 during the processing of body of content 192A. In certain implementations, such question(s) can be generated based on content segment(s) that are processed by content analysis engine 170. As described herein, such questions can reflect, for example a particular content segment having a content element removed or eliminated. The referenced question thus inquires as to the identity of such a removed content element. In certain implementations, such question(s) can also be encoded into a multidimensional vector representation, e.g., using various neural network techniques.

In various implementations, the described technologies may utilize, leverage and/or otherwise communicate with various services such as service 128A and service 128B (collectively services 128), as shown in FIG. 1. Such services can be, for example, third-party services that can enable the retrieval of content (e.g., documents, webpages, etc.) that may enhance or otherwise be relevant to certain operations described herein. Additionally, in certain implementations such services 128 can be services that the user may communicate/interact with, e.g., via mobile application(s) running on device 110.

While many of the examples described herein are illustrated with respect to a single server 140, this is simply for the sake of clarity and brevity. However, the described technologies can also be implemented (in any number of configurations) across multiple servers and/or other computing devices/services.

Further aspects and features of server 140 and device 110 and are described in more detail in conjunction with FIGS. 2-5, below.

As used herein, the term "configured" encompasses its plain and ordinary meaning. In one example, a machine is configured to carry out a method by having software code for that method stored in a memory that is accessible to the processor(s) of the machine. The processor(s) access the memory to implement the method. In another example, the instructions for carrying out the method are hard-wired into the processor(s). In yet another example, a portion of the instructions are hard-wired, and a portion of the instructions are stored as software code in the memory.

Figure 2:
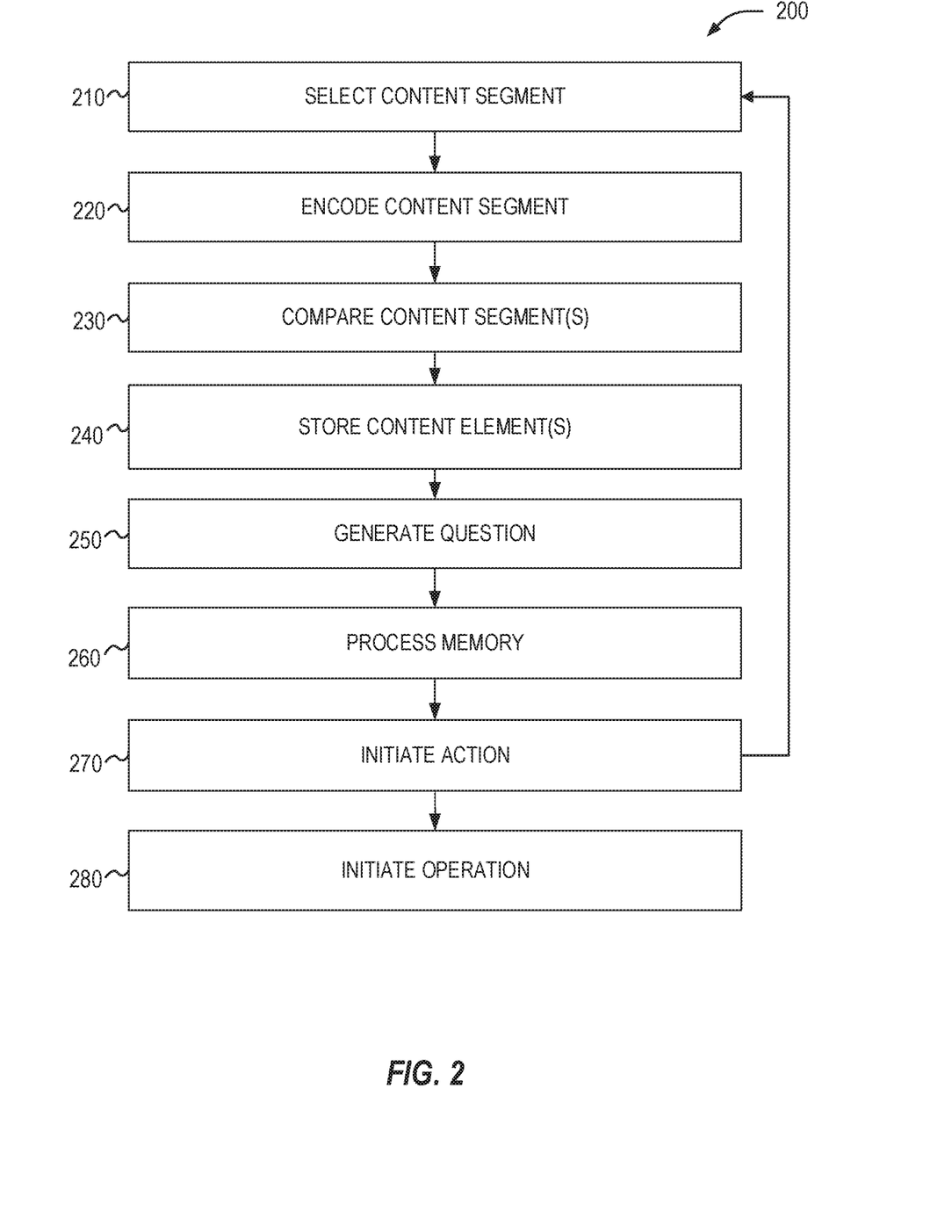
FIG. 2 is a flow chart illustrating a method, in accordance with an example embodiment, for inquiry-based machine learning.

FIG. 2 is a flow chart illustrating a method 200, according to an example embodiment, for inquiry-based machine learning. The method is performed by processing logic that can comprise hardware (circuitry, dedicated logic, etc.), software (such as is run on a computing device such as those described herein), or a combination of both. In one implementation, the method 200 is performed by one or more elements depicted and/or described in relation to FIG. 1 (including but not limited to server 140, question generation engine 150, content analysis engine 170, session memory 180, and/or content repository 190), while in some other implementations, the one or more blocks of FIG. 2 can be performed by another machine or machines.

For simplicity of explanation, methods are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

At operation 210, a first content segment is selected or received. In certain implementations, such a content segment can be selected/received from a body of content, e.g., by content analysis engine 170. Additionally, such a content segment can include various content elements.

Figure 3A:
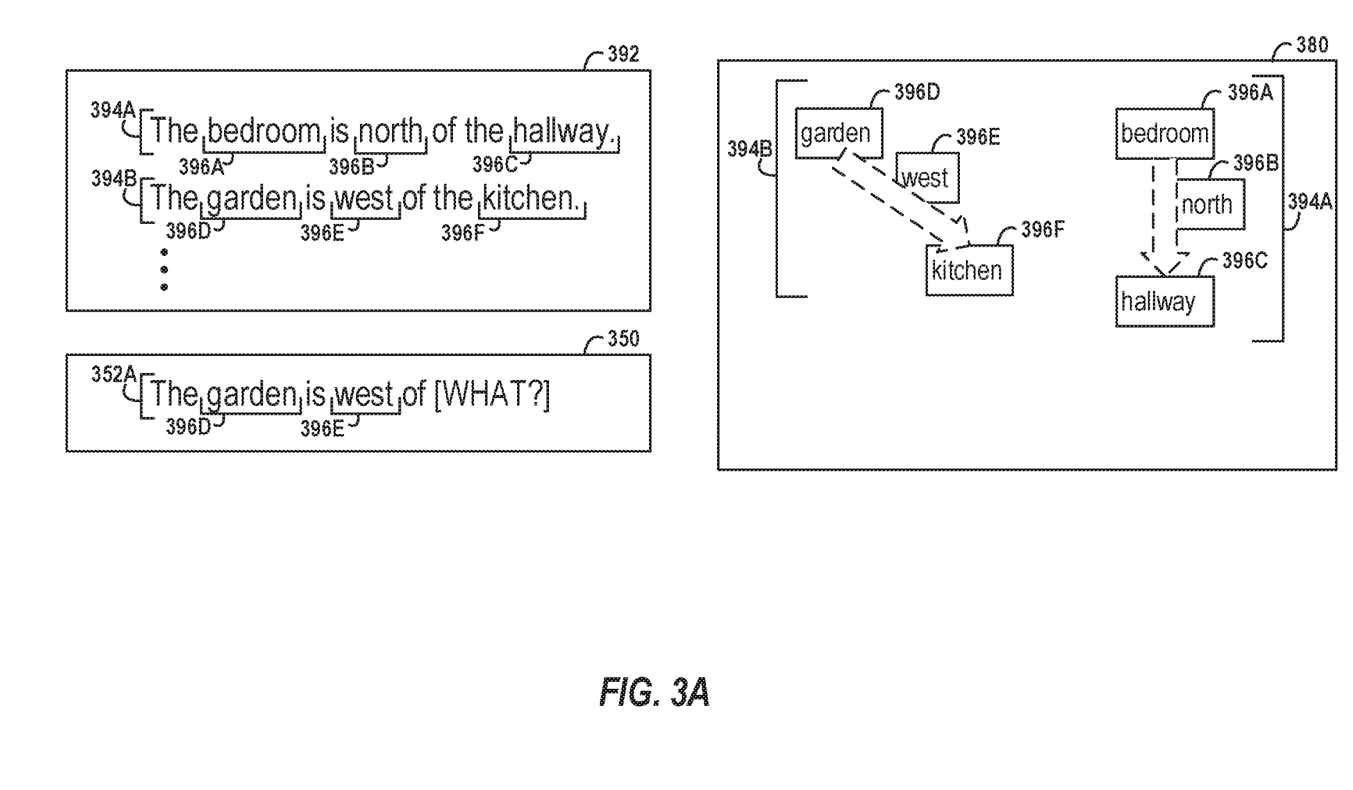
FIGS. 3A-3C illustrate example scenarios described herein, according to example embodiments.

By way of illustration, FIG. 3A depicts an example scenario in which body of content 392 is analyzed in the manner described herein (e.g., by content analysis engine 170). As shown in FIG. 3A, body of content 392 includes content segments such as content segment 394B ("The garden . . . "). Content segment 394B includes content elements such as content element 396D ("garden"), content element, 396E ("west"), as shown. By way of illustration, content analysis engine 170 can receive/select content segment 394B ("The garden . . . ") for processing, e.g., during an analysis of body of content 392.

As described herein, in certain implementations the referenced content segment can include or reflect a representation of a first content segment. For example, as described herein the referenced content segment can be a vector such as a multidimensional vector.

At operation 220, the content segment (e.g., as selected at operation 210) is encoded. In certain implementations, such content segment is encoded using a neural network or other such modeling techniques. In doing so, a representation of the referenced content segment can be generated. For example, in the scenario depicted in FIG. 3A, content segment 394B ("The garden . . . ") can be encoded into a multidimensional vector that reflects various aspects of the content segment (e.g., the various content elements contained therein).

At operation 230, the content segment (e.g., the content segment selected at operation 210 and/or encoded at operation 220) is compared to other content segment(s). In certain implementations, such other content segment(s) can be stored in a memory such as a session memory. In doing so, element(s) present in the selected content segment that are not present in the other content segment(s) can be identified.

By way of illustration, as shown in FIG. 3A, content segment 394B ("The garden . . . ") can be compared with other content segments already stored in session memory 380. For example, content segment 394A ("The bedroom . . . ") is shown as being stored in session memory 380. Accordingly, content segment 394B can be compared with stored content segment 394A to identify content element(s) that are present in content segment 394B but not present in content segment 394A (and thus not stored/reflected in session memory 380).

At operation 240, content element(s) are stored, e.g., in the referenced session memory. In certain implementations, such content element(s) can be stored based on an identification/determination that such content element(s) (e.g., as selected at operation 210) are not already stored in the session memory. In certain implementations, such an identification/determination is computed based on the comparison of respective content segments (e.g., at operation 240). By way of illustration, the comparison of content segment 394B ("The garden . . . ") with content segment 394A ("The bedroom . . . ") as shown in FIG. 3A reflects that content elements 396D-396F are not stored in session memory 380 (e.g., in content segment 394A). Accordingly, such content elements (396D-396F) can be stored in session memory 380, as shown.

At operation 250, a question is generated. In certain implementations, such a question can be generated based on a content segment (e.g., the content segment selected at operation 210). In certain implementations, such a question is generated by removing content element(s) from the content segment. By way of illustration, FIG. 3A depicts question generation engine 350 generating question 352A based on content segment 394B. As shown in FIG. 3A, question 352A is generated by removing a content element (here, 'kitchen') from content segment 394B. In certain implementations, the referenced question can be a representation or encoding of such a question. (e.g., a representation of a content segment with a content element removed).

While the referenced question can be generated based on a single content segment, in certain implementations question(s) can also be generated based on multiple content segments. For example, in certain scenarios session memory 380 can account for multiple content segments in generating a question, as described herein. For example, in the scenario depicted in FIG. 3C, question 352C can be generated to account for content segment 394B and 394C, as shown.

At operation 260, the session memory is processed. In certain implementations, the content segment(s) stored in the referenced session memory can be processed. In doing so, an answer can be computed (e.g., to the question generated at operation 250). For example, content analysis engine 170 can scan the referenced session memory to identify a content element to answer the referenced question (e.g., the question generated at operation 250).

By way of illustration, in the scenario depicted in FIG. 3A, session memory 380 can be processed to identify a content element (from among content elements 396A-396F, as shown) that answers question 352A ("The garden . . . of [WHAT?]"). It can be appreciated that (as shown in FIG. 3A) content elements 396A-396C are not likely to be the relevant/correct answer to question 352A, while content elements 396D-396F (specifically, content element 396F—'kitchen') are considerably more likely.

In certain implementations, the referenced processing (e.g., with respect to the content segment/question) can further include computing a score/metric for various content elements (e.g., within the session memory). Such a score can reflect a value, relevance, etc. of a content element with respect to the question. For example, in a scenario in which a relevant content element is identified with respect to the question, a positive/incremented score can be provided, while identifying an irrelevant content element results in a negative/decremented score.

As noted above, the content segments/content elements stored in session memory can be encoded or stored as a representation (e.g. a vector) of such segments. Accordingly, in certain implementations the referenced question (e.g., question 352A as shown in FIG. 3A can also be encoded/represented in a comparable manner. In doing so, for example, a vector encoding of question 352A can be compared with the respective vector encodings of content segments stored in session memory 380 (e.g., using a neural network). Accordingly, the content segment(s) likely of most relevance to the question 352A are likely content segments that can be identified as being proximate to the question within a vector space of session memory 380.

At operation 270, an action is initiated. In certain implementations, such an action can be initiated based on the answer (e.g., as computed at operation 260). Such an action can include, for example, the further processing the body of content (e.g., from which the content segment selected at operation 210 originated). For example, in scenarios in which the answer computed at operation 260 is determined to be correct, the described technologies can proceed to process another content segment from the body of content, based on the answer.

Figure 3B:
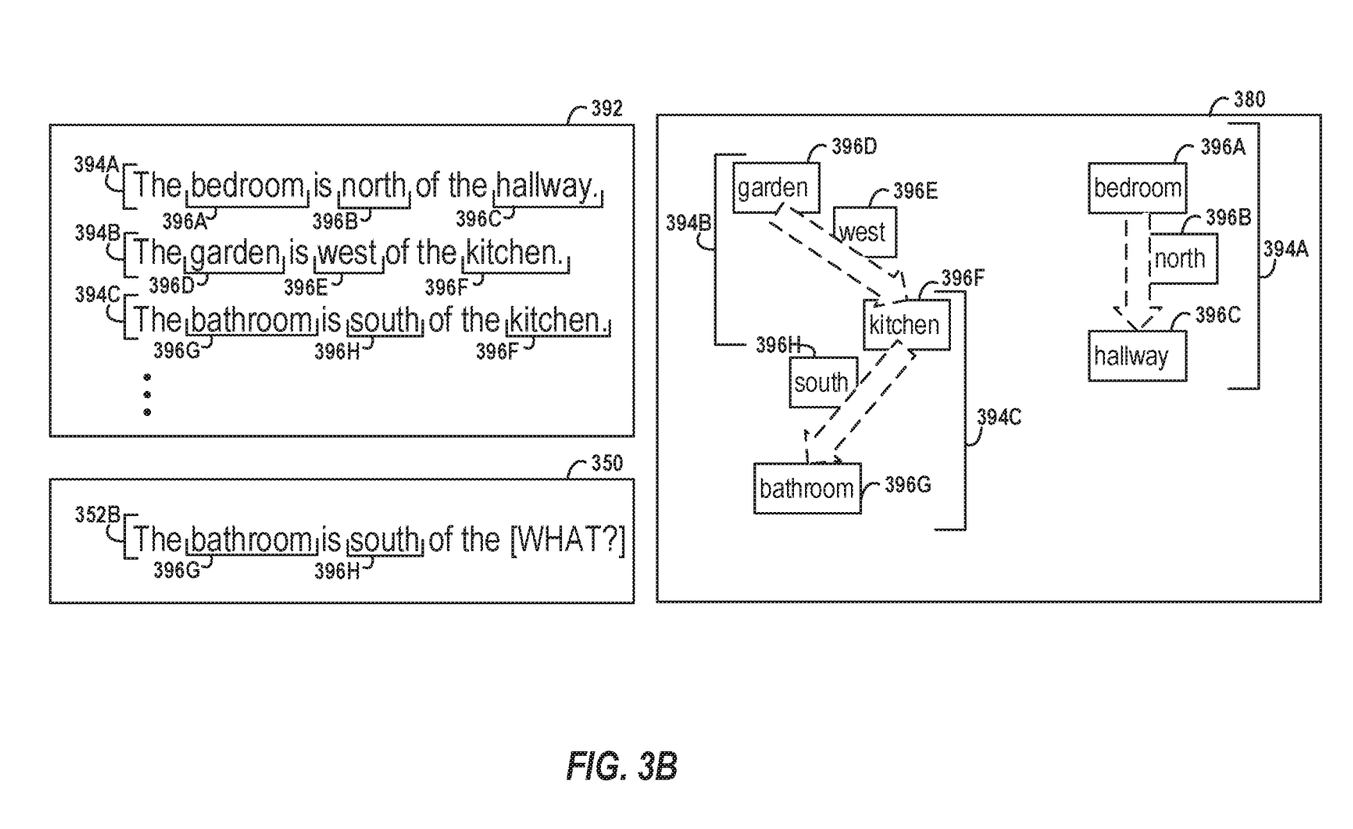

By way of illustration, in the scenario depicted in FIG. 3A, when the answer 'kitchen' is computed/provided with respect to question 352A, the described technologies can proceed to process content segment 394C ("The bathroom . . . ," as shown in FIG. 3B). In doing so, content segment 394C can be selected (e.g., as described at operation 210) and further compared to the content segment(s)/content element(s) already stored in session memory 380 (e.g., as described at operation 230). As shown in FIG. 3B, content element 396F ('kitchen') is already present in session memory 380 while content elements 396H and 396G are not. Accordingly, such content elements can be stored in session memory 380, e.g., in the manner described above (e.g., with respect to operations 230-240).

Moreover, in other scenarios the answer computed at operation 260 can be determined to be incorrect. For example, in the scenario depicted in FIG. 3A, an incorrect answer to question 352A (e.g. "bedroom") can be computed. In such a scenario, in lieu of continuing to process another content segment (as described above), another question can be generated with respect to the same content segment (here, content segment 394B). For example, the question "[WHAT] is west of the kitchen?" can be generated. An answer to such a question can then be computed (as described above). Based on such an answer, the described technologies can proceed to another content segment (e.g., in case of a correct answer) or generate yet another question (in case of an incorrect answer). The results/outcome of such question(s)/answer(s) (e.g., correct/incorrect) can be stored with the referenced session memory. In doing so, conceptual relationships, associations, etc., present in a body of content can be reflected in the session memory and such relationships, etc., can be strengthened on an ongoing basis (e.g., as the content is processed).

In certain implementations, an error threshold can be implemented, whereby the described technologies can proceed to another content segment after a consecutive number of incorrect answers with respect to a prior content segment.

Figure 3C:
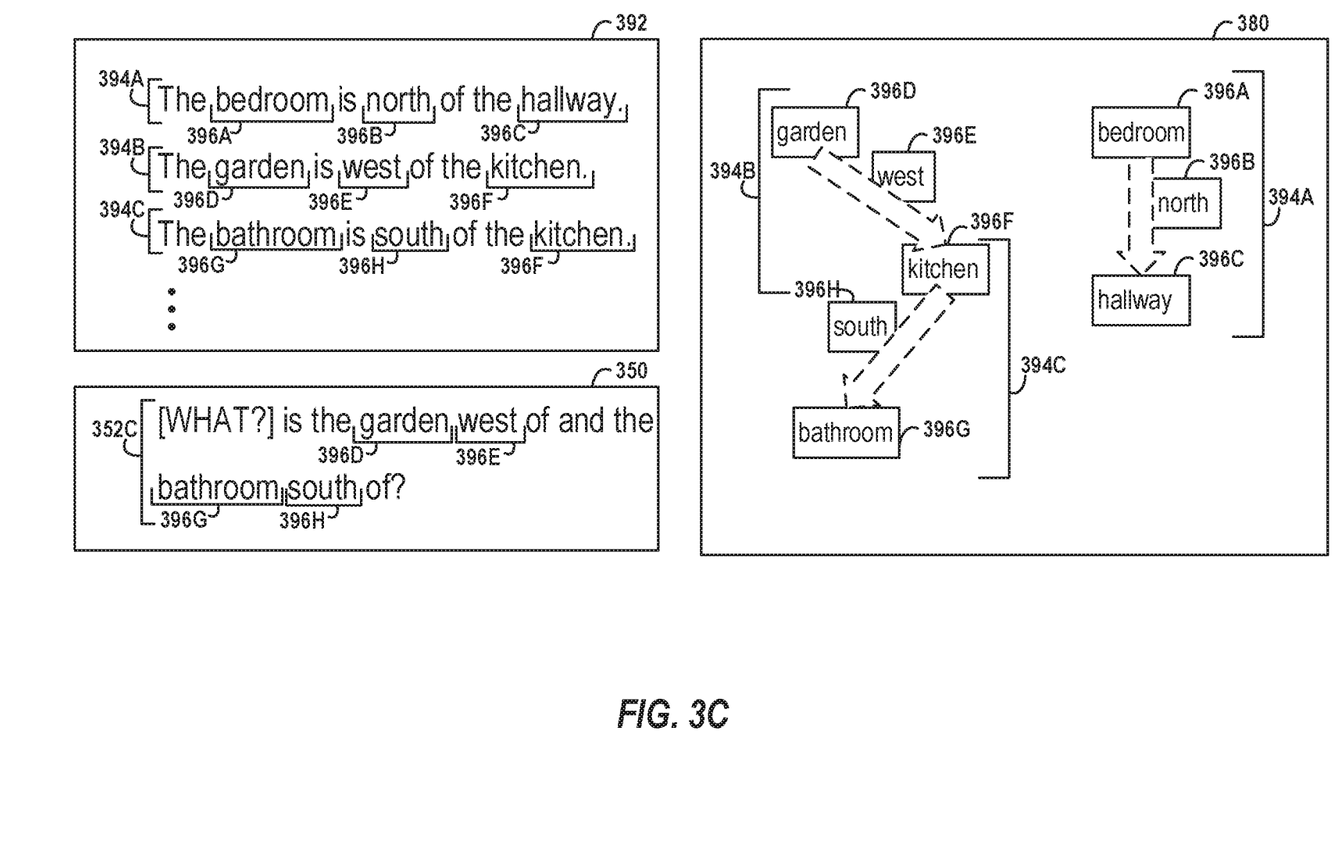

In certain implementations, the described technologies can further generate the referenced questions based on multiple content segments. For example, FIG. 3C depicts question 352C generated based on content segment 394B and content segment 394C. In generating such questions (and further computing answers to them), the described technologies can identify deeper and/or more complex relationships, associations, etc., among various content elements.

At operation 280, an operation is initiated. In certain implementations, such an operation is initiated based on the body of content, as processed (and/or as stored in the session memory). Such an operation can include generating content, transmitting a notification, and/or otherwise initiating another functionality.

Figure 4A:
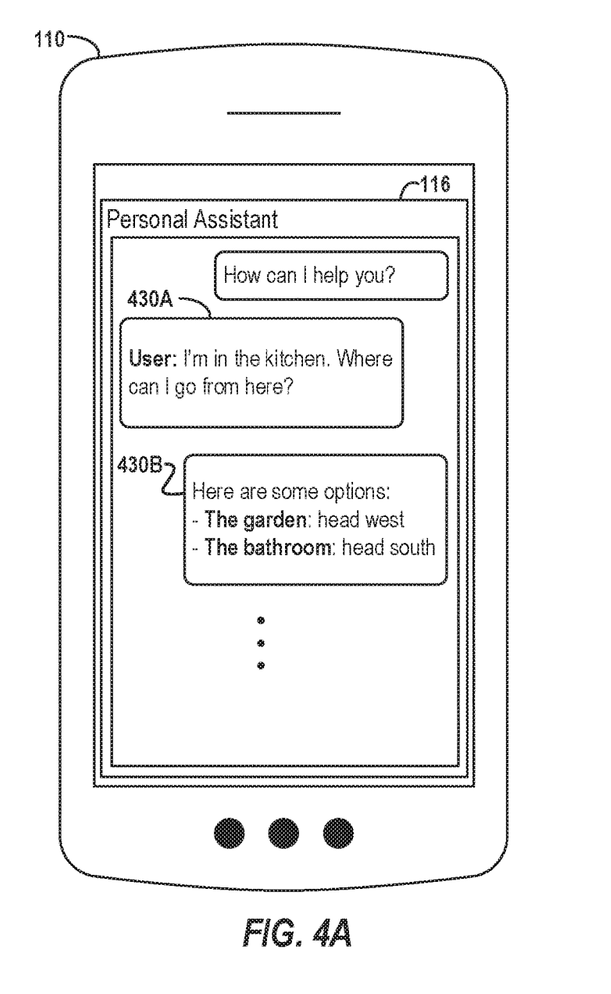
FIGS. 4A and 4B illustrate example scenarios described herein, according to example embodiments.

By way of illustration, FIG. 4A depicts an example scenario in which user 130 is interacting with personal assistant 116 via device 110. As shown in FIG. 4A, in communication 430A, the user requests information regarding "the kitchen." In response, communication 430B ("Here are . . . ") can be generated/provided by personal assistant 116. The content contained in communication 430B (referencing "the garden," "the bathroom," etc., with respect to "the kitchen") can be generated based on association(s) computed via the described technologies (E.g., as depicted in session memory 380 in FIG. 3C).

Figure 4B:
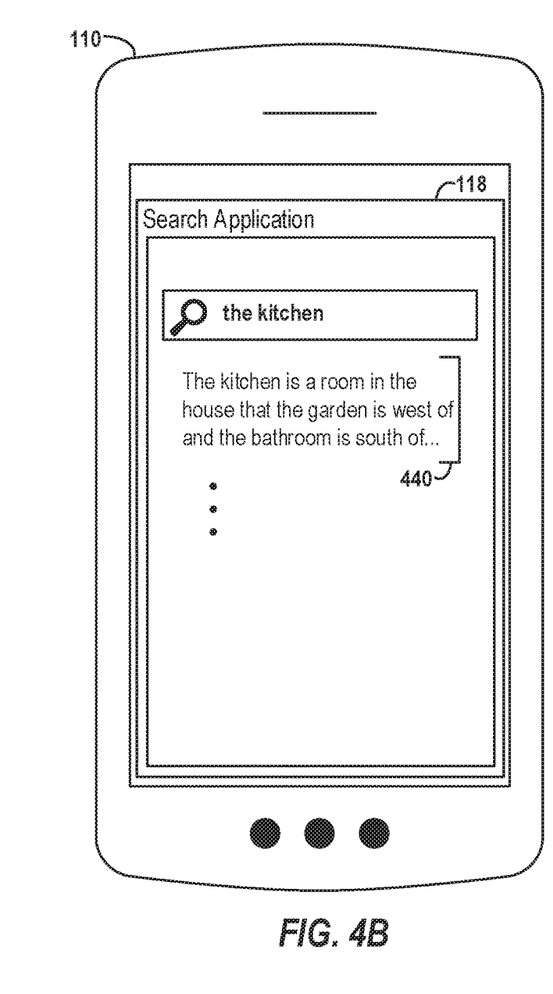

By way of further illustration, FIG. 4B depicts an example scenario in which user 130 is interacting with search application 118 via device 110. As shown in FIG. 4B, in communication 430A, the user submits "the kitchen" as a search query. In response, search result(s) 440 can be generated/provided. The content contained in search result(s) 440 (referencing "the garden," "the bathroom," etc., with respect to "the kitchen") can be generated based on association(s) computed via the described technologies (E.g., as depicted in session memory 380 in FIG. 3C).

It should also be noted that while the technologies described herein are illustrated primarily with respect to inquiry-based machine learning, the described technologies can also be implemented in any number of additional or alternative settings or contexts and towards any number of additional objectives. It should be understood that further technical advantages, solutions, and/or improvements (beyond those described and/or referenced herein) can be enabled as a result of such implementations.

Certain implementations are described herein as including logic or a number of components, modules, or mechanisms. Modules can constitute either software modules (e.g., code embodied on a machine-readable medium) or hardware modules. A "hardware module" is a tangible unit capable of performing certain operations and can be configured or arranged in a certain physical manner. In various example implementations, one or more computer systems (e.g., a standalone computer system, a client computer system, or a server computer system) or one or more hardware modules of a computer system (e.g., a processor or a group of processors) can be configured by software (e.g., an application or application portion) as a hardware module that operates to perform certain operations as described herein.

In some implementations, a hardware module can be implemented mechanically, electronically, or any suitable combination thereof. For example, a hardware module can include dedicated circuitry or logic that is permanently configured to perform certain operations. For example, a hardware module can be a special-purpose processor, such as a Field-Programmable Gate Array (FPGA) or an Application Specific Integrated Circuit (ASIC). A hardware module can also include programmable logic or circuitry that is temporarily configured by software to perform certain operations. For example, a hardware module can include software executed by a general-purpose processor or other programmable processor. Once configured by such software, hardware modules become specific machines (or specific components of a machine) uniquely tailored to perform the configured functions and are no longer general-purpose processors. It will be appreciated that the decision to implement a hardware module mechanically, in dedicated and permanently configured circuitry, or in temporarily configured circuitry (e.g., configured by software) can be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering implementations in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor can be configured as respectively different special-purpose processors (e.g., comprising different hardware modules) at different times. Software accordingly configures a particular processor or processors, for example, to constitute a particular hardware module at one instance of time and to constitute a different hardware module at a different instance of time.

Hardware modules can provide information to, and receive information from, other hardware modules. Accordingly, the described hardware modules can be regarded as being communicatively coupled. Where multiple hardware modules exist contemporaneously, communications can be achieved through signal transmission (e.g., over appropriate circuits and buses) between or among two or more of the hardware modules. In implementations in which multiple hardware modules are configured or instantiated at different times, communications between such hardware modules can be achieved, for example, through the storage and retrieval of information in memory structures to which the multiple hardware modules have access. For example, one hardware module can perform an operation and store the output of that operation in a memory device to which it is communicatively coupled. A further hardware module can then, at a later time, access the memory device to retrieve and process the stored output. Hardware modules can also initiate communications with input or output devices, and can operate on a resource (e.g., a collection of information).

The various operations of example methods described herein can be performed, at least partially, by one or more processors that are temporarily configured (e.g., by software) or permanently configured to perform the relevant operations. Whether temporarily or permanently configured, such processors can constitute processor-implemented modules that operate to perform one or more operations or functions described herein. As used herein, "processor-implemented module" refers to a hardware module implemented using one or more processors.

Similarly, the methods described herein can be at least partially processor-implemented, with a particular processor or processors being an example of hardware. For example, at least some of the operations of a method can be performed by one or more processors or processor-implemented modules. Moreover, the one or more processors can also operate to support performance of the relevant operations in a "cloud computing" environment or as a "software as a service" (SaaS). For example, at least some of the operations can be performed by a group of computers (as examples of machines including processors), with these operations being accessible via a network (e.g., the Internet) and via one or more appropriate interfaces (e.g., an API).

The performance of certain of the operations can be distributed among the processors, not only residing within a single machine, but deployed across a number of machines. In some example implementations, the processors or processor-implemented modules can be located in a single geographic location (e.g., within a home environment, an office environment, or a server farm). In other example implementations, the processors or processor-implemented modules can be distributed across a number of geographic locations.

The modules, methods, applications, and so forth described in conjunction with FIGS. 1-4B are implemented in some implementations in the context of a machine and an associated software architecture. The sections below describe representative software architecture(s) and machine (e.g., hardware) architecture(s) that are suitable for use with the disclosed implementations.

Software architectures are used in conjunction with hardware architectures to create devices and machines tailored to particular purposes. For example, a particular hardware architecture coupled with a particular software architecture will create a mobile device, such as a mobile phone, tablet device, or so forth. A slightly different hardware and software architecture can yield a smart device for use in the "internet of things," while yet another combination produces a server computer for use within a cloud computing architecture. Not all combinations of such software and hardware architectures are presented here, as those of skill in the art can readily understand how to implement the inventive subject matter in different contexts from the disclosure contained herein.

FIG. 5 is a block diagram illustrating components of a machine 500, according to some example implementations, able to read instructions from a machine-readable medium (e.g., a machine-readable storage medium) and perform any one or more of the methodologies discussed herein. Specifically, FIG. 5 shows a diagrammatic representation of the machine 500 in the example form of a computer system, within which instructions 516 (e.g., software, a program, an application, an applet, an app, or other executable code) for causing the machine 500 to perform any one or more of the methodologies discussed herein can be executed. The instructions 516 transform the general, non-programmed machine into a particular machine programmed to carry out the described and illustrated functions in the manner described. In alternative implementations, the machine 500 operates as a standalone device or can be coupled (e.g., networked) to other machines. In a networked deployment, the machine 500 can operate in the capacity of a server machine or a client machine in a server-client network environment, or as a peer machine in a peer-to-peer (or distributed) network environment. The machine 500 can comprise, but not be limited to, a server computer, a client computer, PC, a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 516, sequentially or otherwise, that specify actions to be taken by the machine 500. Further, while only a single machine 500 is illustrated, the term "machine" shall also be taken to include a collection of machines 500 that individually or jointly execute the instructions 516 to perform any one or more of the methodologies discussed herein.

The machine 500 can include processors 510, memory/storage 530, and I/O components 550, which can be configured to communicate with each other such as via a bus 502. In an example implementation, the processors 510 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) can include, for example, a processor 512 and a processor 514 that can execute the instructions 516. The term "processor" is intended to include multi-core processors that can comprise two or more independent processors (sometimes referred to as "cores") that can execute instructions contemporaneously. Although FIG. 5 shows multiple processors 510, the machine 500 can include a single processor with a single core, a single processor with multiple cores (e.g., a multi-core processor), multiple processors with a single core, multiple processors with multiples cores, or any combination thereof.

The memory/storage 530 can include a memory 532, such as a main memory, or other memory storage, and a storage unit 536, both accessible to the processors 510 such as via the bus 502. The storage unit 536 and memory 532 store the instructions 516 embodying any one or more of the methodologies or functions described herein. The instructions 516 can also reside, completely or partially, within the memory 532, within the storage unit 536, within at least one of the processors 510 (e.g., within the processor's cache memory), or any suitable combination thereof, during execution thereof by the machine 500. Accordingly, the memory 532, the storage unit 536, and the memory of the processors 510 are examples of machine-readable media.

As used herein, "machine-readable medium" means a device able to store instructions (e.g., instructions 516) and data temporarily or permanently and can include, but is not limited to, random-access memory (RAM), read-only memory (ROM), buffer memory, flash memory, optical media, magnetic media, cache memory, other types of storage (e.g., Erasable Programmable Read-Only Memory (EEPROM)), and/or any suitable combination thereof. The term "machine-readable medium" should be taken to include a single medium or multiple media (e.g., a centralized or distributed database, or associated caches and servers) able to store the instructions 516. The term "machine-readable medium" shall also be taken to include any medium, or combination of multiple media, that is capable of storing instructions (e.g., instructions 516) for execution by a machine (e.g., machine 500), such that the instructions, when executed by one or more processors of the machine (e.g., processors 510), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The I/O components 550 can include a wide variety of components to receive input, provide output, produce output, transmit information, exchange information, capture measurements, and so on. The specific I/O components 550 that are included in a particular machine will depend on the type of machine. For example, portable machines such as mobile phones will likely include a touch input device or other such input mechanisms, while a headless server machine will likely not include such a touch input device. It will be appreciated that the I/O components 550 can include many other components that are not shown in FIG. 5. The I/O components 550 are grouped according to functionality merely for simplifying the following discussion and the grouping is in no way limiting. In various example implementations, the I/O components 550 can include output components 552 and input components 554. The output components 552 can include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 554 can include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example implementations, the I/O components 550 can include biometric components 556, motion components 558, environmental components 560, or position components 562, among a wide array of other components. For example, the biometric components 556 can include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 558 can include acceleration sensor components (e.g., accelerometer), gravitation sensor components, rotation sensor components (e.g., gyroscope), and so forth. The environmental components 560 can include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that can provide indications, measurements, or signals corresponding to a surrounding physical environment. The position components 562 can include location sensor components (e.g., a Global Position System (GPS) receiver component), altitude sensor components (e.g., altimeters or barometers that detect air pressure from which altitude can be derived), orientation sensor components (e.g., magnetometers), and the like.

Communication can be implemented using a wide variety of technologies. The I/O components 550 can include communication components 564 operable to couple the machine 500 to a network 580 or devices 570 via a coupling 582 and a coupling 572, respectively. For example, the communication components 564 can include a network interface component or other suitable device to interface with the network 580. In further examples, the communication components 564 can include wired communication components, wireless communication components, cellular communication components. Near Field Communication (NFC) components, Bluetooth® components (e.g., Bluetooth® Low Energy), Wi-Fi® components, and other communication components to provide communication via other modalities. The devices 570 can be another machine or any of a wide variety of peripheral devices (e.g., a peripheral device coupled via a USB).

Moreover, the communication components 564 can detect identifiers or include components operable to detect identifiers. For example, the communication components 564 can include Radio Frequency Identification (RFID) tag reader components, NFC smart tag detection components, optical reader components (e.g., an optical sensor to detect onedimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information can be derived via the communication components 564, such as location via Internet Protocol (IP) geolocation, location via Wi-Fi® signal triangulation, location via detecting an NFC beacon signal that can indicate a particular location, and so forth.

In various example implementations, one or more portions of the network 580 can be an ad hoc network, an intranet, an extranet, a virtual private network (VPN), a local area network (LAN), a wireless LAN (WLAN), a WAN, a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, the network 580 or a portion of the network 580 can include a wireless or cellular network and the coupling 582 can be a Code Division Multiple Access (CDMA) connection, a Global System for Mobile communications (GSM) connection, or another type of cellular or wireless coupling. In this example, the coupling 582 can implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

The instructions 516 can be transmitted or received over the network 580 using a transmission medium via a network interface device (e.g., a network interface component included in the communication components 564) and utilizing any one of a number of well-known transfer protocols (e.g., HTTP). Similarly, the instructions 516 can be transmitted or received using a transmission medium via the coupling 572 (e.g., a peer-to-peer coupling) to the devices 570. The term "transmission medium" shall be taken to include any intangible medium that is capable of storing, encoding, or carrying the instructions 516 for execution by the machine 500, and includes digital or analog communications signals or other intangible media to facilitate communication of such software.

Throughout this specification, plural instances can implement components, operations, or structures described as a single instance. Although individual operations of one or more methods are illustrated and described as separate operations, one or more of the individual operations can be performed concurrently, and nothing requires that the operations be performed in the order illustrated. Structures and functionality presented as separate components in example configurations can be implemented as a combined structure or component. Similarly, structures and functionality presented as a single component can be implemented as separate components. These and other variations, modifications, additions, and improvements fall within the scope of the subject matter herein.

Although an overview of the inventive subject matter has been described with reference to specific example implementations, various modifications and changes can be made to these implementations without departing from the broader scope of implementations of the present disclosure. Such implementations of the inventive subject matter can be referred to herein, individually or collectively, by the term "invention" merely for convenience and without intending to voluntarily limit the scope of this application to any single disclosure or inventive concept if more than one is, in fact, disclosed.

The implementations illustrated herein are described in sufficient detail to enable those skilled in the art to practice the teachings disclosed. Other implementations can be used and derived therefrom, such that structural and logical substitutions and changes can be made without departing from the scope of this disclosure. The Detailed Description, therefore, is not to be taken in a limiting sense, and the scope of various implementations is defined only by the appended claims, along with the full range of equivalents to which such claims are entitled.

As used herein, the term "or" can be construed in either an inclusive or exclusive sense. Moreover, plural instances can be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and can fall within a scope of various implementations of the present disclosure. In general, structures and functionality presented as separate resources in the example configurations can be implemented as a combined structure or resource. Similarly, structures and functionality presented as a single resource can be implemented as separate resources. These and other variations, modifications, additions, and improvements fall within a scope of implementations of the present disclosure as represented by the appended claims. The specification and drawings are, accordingly, to be regarded in an illustrative rather than a restrictive sense.

What is claimed is:

1. A system comprising:
   a processing device; and
   a memory coupled to the processing device and storing instructions that, when executed by the processing device, cause the system to perform operations comprising:
      storing a first content segment and a second content segment from a body of content in session memory;
      comparing the first content segment to the second content segment to identify a content element present in the first content segment that is not present in the second content segment;
      training a machine learning model by:
         encoding, with a neural network, a state representation of the first content segment in relation to the second content segment based on the content element;
         updating the session memory with the state representation for the first content segment and the second content segment;
         generating, with a question generation engine, a first question based on the first content segment and the second content segment; and processing the session memory, including the state representation, to compute an answer to the first question; and initiating an action based on the computed answer.

2. The system of claim 1, wherein generating the first question comprises removing at least one content element from the first content segment.

3. The system of claim 2, wherein the first question comprises a representation of the first content segment with the content element removed.

4. The system of claim 1, wherein processing the session memory comprises processing one or more content segments stored in the session memory.

5. The system of claim 1, wherein processing the session memory comprises processing the first content segment in relation to the first question to compute a score for one or more content elements within the session memory, the score reflecting a relevance of the identified content element with respect to the first question.

6. The system of claim 1, wherein processing the session memory comprises processing the first content segment in relation to the question using a neural network to identify a second content element within the first content segment that pertains to the first question.

7. The system of claim 1, wherein the first content segment comprises a vector representation of the first content segment.

8. The system of claim 1, wherein initiating the action comprises further processing the body of content based on the answer.

9. The system of claim 8, wherein further processing the body of content comprises:
based on a determination that the answer is correct with respect to the first question, selecting a third content segment; and
identifying a content element present in the third content segment that is not present in the first content segment nor the second content segment.

10. The system of claim 9, wherein the memory further stores instructions for causing the system to perform operations comprising: initiating an operation based on the body of content, as processed.

11. The system of claim 8, wherein further processing the body of content comprises:
based on a determination that the answer is incorrect with respect to the first question, generating a second question based on the first content segment; and
processing one or more content segments stored in the session memory to compute an answer to the second question.

12. The method of claim 1, further comprising: initiating an operation based on the body of content, as processed.

13. A method comprising:
storing a first content segment and a second content segment from a body of content in session memory;
comparing the first content segment to the second content segment to identify a content element present in the first content segment that is not present in the second content segment;
training a machine learning model by:
encoding, with a neural network, a state representation of the first content segment in relation to the second content segment based on the content element;
updating the session memory with the state representation for the first content segment and the second content segment;
generating, with a question generation engine, a first question based on the first content segment and the second content segment; and
processing the session memory, including the state representation, to compute an answer to the first question using the state representation; and
initiating an action based on the computed answer.

14. The method of claim 13, wherein initiating the action comprises further processing the body of content based on the answer.

15. The method of claim 14, wherein further processing the body of content comprises:
based on a determination that the answer is correct with respect to the question, selecting a third content segment; and
comparing the third content segment to the first content segment and the second content segment to identify a content element present in the third content segment that is not present in the first content segment and the second content segment.

16. The method of claim 14, wherein further processing the body of content comprises:
based on a determination that the answer is incorrect with respect to the first question, generating a second question based on the first content segment; and
processing one or more content segments stored in the session memory to compute an answer to the second question.

17. A non-transitory computer readable medium having instructions stored thereon that, when executed by a processing device, cause the processing device to perform operations comprising:
storing a first content segment and a second content segment from a body of content in session memory;
comparing the first content segment to the second content segment to identify a content element present in the first content segment that is not present in the second content segment;
training a machine learning model by:
encoding, with a neural network, a state representation of the first content segment in relation to the second content segment based on the content element;
updating the session memory with the state representation for the first content segment and the second content segment;
generating, with a question generation engine, a first question based on the first content segment and the second content segment;
processing the session memory, including the state representation, to compute an answer to the first question and the second content segment for the attention network;
further processing the body of content based on the answer;
selecting a third content segment; and
comparing the third content segment to the first content segment and the second content segment to identify a content element present in the third content segment that is not present in the first content segment and the second content segment.

18. The computer-readable medium of claim 17, wherein processing the session memory includes using the first content segment in relation to the first question to compute a score for one or more content elements within the session memory, the score reflecting a relevance of the content element with respect to the first question.

* * * * *